United States Patent Office 3,155,310
Patented Nov. 3, 1964

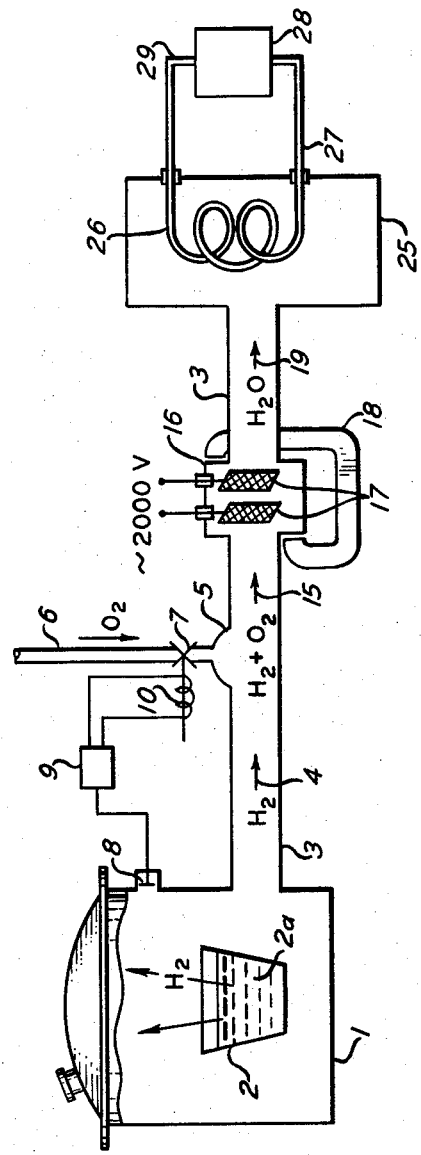

3,155,310
METHOD OF PRODUCING A VACUUM
Albert Lorenz, Hanau (Main), Germany, assignor to W. C. Heraeus, G.m.b.H., Hanau (Main), Germany, a corporation of Germany
Filed Mar. 7, 1961, Ser. No. 108,969
Claims priority, application Germany Mar. 12, 1960
13 Claims. (Cl. 230—69)

The present invention relates to improvements in the method of producing a vacuum by condensing the vapors and gases to be evacuated by means of very low temperatures, such as the temperatures of liquid hydrogen or helium. This method has in recent times become known as the cryotechnical or cryo method of producing a vacuum, and the evacuating apparatus for carrying out this method as a cryo pump.

In connection with diffusion pumps it is known for a long time that the back-diffusing components of the vapors which serve as a propellant may be eliminated by being condensed by freezing. This condensation or freezing occurs on certain obstructions which the back diffusing vapor molecules meet in their travel, and the cooling action is usually attained by water, by a refrigerating machine, or by means of liquid air. Freezing apparatus which are filled with liquid air have also already been used in connection with vacuum apparatus, for example, evaporation apparatus, in order to eliminate the vapors therefrom. In recent times it has also become known that almost all of the gases within a container may be eliminated from it by severly cooling a part of the walls or certain parts of the apparatus which are especially provided for this purpose. For carrying out this method, liquid hydrogen of approximately 20° K. (Kelvin) or liquid helium of appproximately 4° K. have been used. This method has, however, the following very serious disadvantage.

In the first instance, at least those gases, the liquid phase of which is utilized in the freezing process as a cooling agent will not be frozen. When using, for example, liquid hydrogen, the hydrogen gas within the container to be evacuated will only be partly eliminated. Even with liquid helium it is not possible to freeze out the hydrogen gas from the container since the vapor pressure of the hydrogen gas is still considerable even at a temperature of 4° K.

The same occurs with some of the rare gases. In many cases these gases as well as hydrogen do not interfere with the generation of a higher vacuum. This is due to the fact that the mentioned gases are contained only in very small amounts in the normal original air in the container to be evacuated, and that the cryotechnical evacuation usually does not start until after the container has been partly evacuated by one or more conventional vacuum pumps. These gases are then diluted to such an extent that it is possible to attain a vacuum of, for example, $10^{-9}$ or even a better vacuum.

The conditions are, however, quite different as soon as a larger amount of hydrogen is liberated in the container, for example, when certain metals are melted under a vacuum. At such a time, the gas pressure of the liberated hydrogen remains in the container and the vacuum attainable therein is not sufficient for many purposes.

It is an object of the invention to overcome this disadvantage of the cryotechnical method of producing a vacuum. According to the invention, it has been found that this may be achieved in a surprisingly simple manner by passing into the conduit connecting the container to be evacuated to the freezing or cryo pump a specific amount of an auxiliary gas which will go into reaction with the gas from the container, which can be frozen only with difficulty so as to form reaction products which may then be easily frozen.

If, for example, the gas to be evacuated contains hydrogen, a corresponding amount of oxygen serving as the auxiliary gas is continuously passed into the connecting conduit between the container to be evacuated and the cryo pump. The reacation between the two gases then results in water vapor which may be easily frozen. In the evacuation of a container it is thus easily possible also to remove the hydrogen which may otherwise be removed only with great difficulty. For this purpose it is not even necessary to apply liquid helium, but liquid hydrogen will also suffice.

The amount of the respective auxiliary gas to be injected depends upon the amount of gas which is being conveyed from the container to be evacuated, that is, upon the effective capacity of the cryo pump. Since this pump can eliminate almost any amount of gases, the pumping capacity depends primarily on the diameter and length of the pump line and in addition upon the prevailing pressure which, however, is variable. It is therefore very advisable to control the amount of auxiliary gas to be injected in accordance with the pressure within the container to be evacuated.

In order to insure that the gas to be eliminated which is difficult to condense will be taken up completely in the freezable mixture, it has been determined according to the invention that it is advisable to add not only the normally required amount of auxiliary gas, but also a certain excess thereof. This will insure that the desired reaction will take place completely. For this reason it is also very advisable to use an auxiliary gas which will also be transformed as such into the solid state at the freezing temperature as chosen.

The reaction is preferably ignited in a manner similar as in a Penning gauge by means of a glow discharge by which it is preferably continued without interruption until the evacuation process has been completed.

The features and advantages of the present invention will become more clearly apparent from the following detailed description thereof which is to be read with reference to the accompanying diagrammatic drawing of an apparatus for carrying out the inventive method.

In the drawing, the container 1 to be evacuated contains a crucible 2 with a material 2a therein which may, for example, be a molten metal which gives off hydrogen. The container 1 has a suction pipe 3 connected thereto through which the hydrogen is sucked off in the direction of the arrow 4.

At a suitable point 5 oxygen is passed into suction pipe 3 which is supplied through a line 6 and a control valve 7. The operation of this valve 7 is controlled by a vacuum gauge 8, a control unit 9, and, in the particular case as illustrated, by a solenoid 10 which acts upon valve 7.

Thus, there will be a mixture of hydrogen and oxygen flowing in the direction of arrow 15. This mixture then passes into a glow discharge apparatus 16 which essentially comprises a pair of electrode plates 17 which are connected to a high tension of, for example, 2000 volts of direct current. In order to maintain the luminous glow discharge also at a lower pressure, the length of the path of the resulting electrons and ions is increased by the provision of a magnet 18 as indicated diagrammatically in the drawing. The hydrogen and oxygen molecules prevailing in discharge apparatus 16 then react with each other and form water vapor which then passes through the suction line 3 in the direction of arrow 19.

Suction pipe 3 terminates into a cryo pump 25, the refrigerating coils 26 of which are cooled by liquid helium which is supplied from below through a line 27 from a refrigerating machine 28, is then vaporized in coils 26 and returned in a gaseous form to the refrigerating machine 28 through line 29.

The drawing only illustrates diagrammatically those elements of the apparatus which are absolutely required according to the invention. This apparatus may be further provided with additional pumps of a conventional type, that is, with rotary or diffusion pumps, and with supplementary devices such as control elements, valves, and the like.

Since the inventive method permits nearly unlimited amounts of gases to be solidified, it is applicable not only for producing the highest possible vacuum, but also as a pumping method for carrying out industrial processes, that is, primarily processes which have to be carried out under a normally high vacuum and at the highest possible suction velocity. This may be attained more effectively and at higher velocities with a cryo pump according to the invention than with pump units of any other conventional type or design. Obviously, the refrigerating agent may also consist of materials other than liquid hydrogen or liquid helium, and insofar as the invention is concerned, it is merely of importance that at the particular freezing temperature the prevailing gases are hard to condense and to be solidified, and that it is possible by the addition of a complementary gas which reacts with the prevailing gas to convert the latter into a combination which may be easily frozen and thus eliminated from the apparatus by means of a refrigerating machine.

Although my invention has been illustrated and described with reference to the preferred embodiments thereof, I wish to have it understood that it is in no way limited to the details of such embodiments, but is capable of numerous modifications within the scope of the appended claims.

Having fully disclosed my invention, what I claim is:

1. A method of producing a vacuum in a container comprising the steps of conducting the gases and vapors to be evacuated from said container including a gas which is difficult to condense, to a cryo pump so as to condense said gases and vapors by freezing, of adding an auxiliary gas capable of reacting with said difficultly condensable gas so as to form a product which is easily condensable by freezing in said cryo pump, and of igniting the mixture of said auxiliary gas and said difficultly condensable gas for causing a reaction therebetween.

2. A method of producing a vacuum in a container comprising the steps of conducting the gases and vapors to be evacuated from said container including a gas which is difficult to condense, to a cryo pump so as to condense said gases and vapors by freezing, of feeding into said flow of gases and vapors specific amounts of an auxiliary gas capable of reacting with said difficultly condensable gas so as to form a product which is easily condensable by freezing, and of igniting the mixture of said auxiliary gas and said difficultly condensable gas for causing a reaction therebetween.

3. A method as defined in claim 1, in which said auxiliary gas is of the type which will be solidified at the freezing temperature as applied by said cryo pump.

4. A method as defined in claim 1, in which the refrigerant applied in said cryo pump consists of liquid helium.

5. A method as defined in claim 1, in which the refrigerant applied in said cryo pump consists of liquid hydrogen.

6. A method as defined in claim 1, in which said difficultly condensable gas consists of hydrogen and said auxiliary gas consists of oxygen.

7. A method of producing a vacuum in a container comprising the steps of conducting the gases and vapors to be evacuated from said container, including a gas which is difficult to condense, through a connecting conduit to a cryo pump so as to condense said gases and vapors by freezing, and of feeding into said conduit an auxiliary gas capable of reacting with said difficultly condensable gas so as to form a product which is easily condensable by freezing in said cryo pump, of controlling the amount of said auxiliary gas supplied into said conduit in accordance with the pressure in said container, and of igniting the mixture of said auxiliary gas and said difficultly condensable gas for causing a reaction therebetween.

8. A method of producing a vacuum in a container comprising the steps of conducting the gases and vapors to be evacuated from said container, including a gas which is difficult to condense, through a connecting conduit to a cryo pump so as to condense said gases and vapors, and of feeding into said conduit an auxiliary gas capable of reacting with said difficultly condensable gas so as to form a product which is easily condensable by freezing in said cryo pump, of controlling the amount of said auxiliary gas supplied into said conduit so that a small excess of said auxiliary gas will remain after the reaction of said auxiliary gas with said difficultly condensable gas so as to insure that said difficultly condensable gas will be completely eliminated, and of igniting the mixture of said auxiliary gas and said difficultly condensable gas for causing a reaction therebetween.

9. A method of producing a vacuum in a container comprising the steps of conducting the gases and vapors to be evacuated from said container, including a gas which is difficult to condense, to a cryo pump so as to condense said gases and vapors by freezing, feeding into the flow of said gases and vapors to said cryo pump an auxiliary gas capable of reacting with said difficultly condensable gas, and of igniting the mixture of said auxiliary gas and said difficultly condensable gas to cause a reaction therebetween by an electrical glow discharge maintained at a point of the flow of at least said two gases intermediate the point of insertion of said auxiliary gas and said cryo pump.

10. A method as defined in claim 9, in which the igniting glow discharge is continuously maintained for continuously maintaining said reaction enabling the continuous and complete elimination of said difficultly condensable gas by the continuous condensation of the reaction product in the cryo pump.

11. An apparatus for producing a vacuum, comprising a container containing gases and vapors to be evacuated, including a gas which is difficult to condense, a cryo pump, a conduit connecting said container with said pump, a second conduit connected to said first conduit for conducting into the same an auxiliary gas capable of reacting with said difficultly condensable gas, means for controlling the amount of said auxiliary gas supplied to said first conduit, and means for igniting the mixture of said auxiliary gas and said difficultly condensable gas for causing a reaction therebetween.

12. An apparatus as defined in claim 11, in which said control means comprise a control valve in said second conduit, a pressure gauge connected to said container for measuring the pressure therein, and means responsive to the operation of said pressure gauge for controlling the operation of said control valve.

13. An apparatus for producing a vacuum comprising a container containing gases and vapors to be evacuated, including a gas which is difficult to condense, a cryo pump, a conduit connecting said container with said pump, a second conduit connected to said first conduit for conducting into the same an auxiliary gas capable of reacting with said difficultly condensable gas, means for controlling the amount of said auxiliary gas supplied to said first conduit in accordance with the pressure in said container, and glow discharge means interposed in said conduit between the point of connection of said second conduit to said first conduit and said cryo pump for bringing said auxiliary gas into reaction with said difficultly condensable gas.

References Cited in the file of this patent

UNITED STATES PATENTS

| | | |
|---|---|---|
| 956,097 | Hoofnagle | Apr. 26, 1910 |
| 2,044,750 | Bryant | June 16, 1936 |
| 2,088,012 | Rector | July 27, 1937 |
| 2,757,840 | Weissenberg | Aug. 7, 1956 |